No. 887,084. PATENTED MAY 12, 1908.
W. M. FULTON.
FLEXIBLE CORRUGATED WALL.
APPLICATION FILED MAY 29, 1907.
Fig. 1.
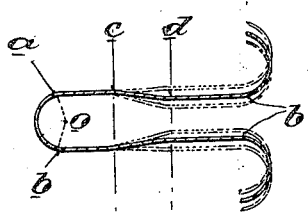
Fig. 2.
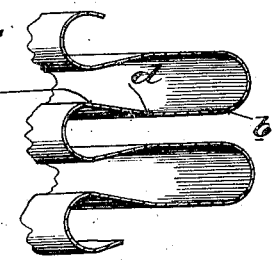
Fig. 3.
Fig. 4.
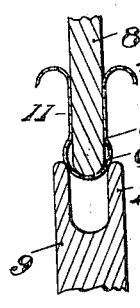
Fig. 5. Fig. 6. Fig. 7. Fig. 8. Fig. 9.
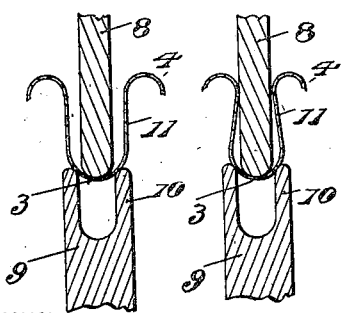
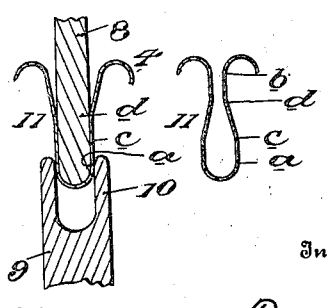
Witnesses
Gustave R. Thompson
Ruth C. Fitzhugh
Inventor
Weston M. Fulton,
By Mauro, Cameron, Lewis, Massie
Attorneys

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

FLEXIBLE CORRUGATED WALL.

No. 887,084.　　　　Specification of Letters Patent.　　Patented May 12, 1908.

Application filed May 29, 1907. Serial No. 376,440.

*To all whom it may concern:*

Be it known that I, WESTON M. FULTON, of Knoxville, Tennessee, have invented a new and useful Improvement in Flexible Corrugated Walls, which improvement is fully set forth in the following specification.

This invention relates to improvements in flexible corrugated tubular metal walls for collapsible and expansible vessels, and has for its object to provide walls of the class referred to in which the burden of compression and expansion will be more easily distributed to all portions of the wall, thereby relieving the strains at the curved portions of the corrugations.

It has heretofore been preposed, as in applicant's Patent No. 729,926, to connect the outer and inner curves of the corrugations with lateral corrugated portions so as to stiffen said portions and prevent them from yielding except in the desired direction.

In the present invention I have aimed to simplify the above construction of the corrugations while retaining the advantages of a very flexible wall, and particularly I have relieved the curved portions of the corrugations from bending strains, and have enabled the lateral portions to largely contribute to the movement of expansion and contraction of the wall. By thus simplifying the form of the corrugation without sacrificing any of the advantages, I have also enabled the wall to be more easily made, and thereby cheapened its construction.

My invention chiefly resides in so constructing the lateral portions of the corrugations as to enable them to contribute largely to the movement of expansion and contraction of the wall, and thereby reduce the bending motion in the curved portions, and broadly stated, consists in providing a flexible corrugated wall, the same consisting of alternate concave and convex members and lateral connecting members, each of said lateral connecting members containing a portion lying in a plane approximately normal to the axis of the wall, and another portion lying in a plane making an angle with said normal portions, whereby the strains at the curved portions of the corrugations may be greatly relieved and the movement of contraction and expansion may take place in the lateral portions as well as in the bends.

In order that the invention may be more readily understood, reference will be had to the accompanying drawings, which are intended as illustrations to assist the description of the invention and not as defining the limits thereof, reference being had to the claims for that purpose.

Figure 1 is a vertical central section of a corrugated wall, showing the corrugations in normal position; Fig. 2 is an enlarged fragmentary view showing the wall in section, the dotted line positions showing the wall when expanded and collapsed; Fig. 3 is a similar view to Fig. 2, but showing a certain portion of the wall omitted; and Figs. 4 to 9 inclusive are more or less diagrammatic views showing the method of making the wall.

Referring to Fig. 1, the flexible tubular wall 1 is made of sheet metal such as steel or brass, and is provided with a series of corrugations which are made up of curved portions 3, 4 included approximately between the radii $o\ a$ and $o\ b$, as indicated in Fig. 1. These curved portions are connected in series by a lateral portion extending between the points $a$ and $b$. These lateral curve-connecting portions consist of flat portions $a\ c$, $b\ d$, substantially normal to the axis of the tubular wall, together with portions $c\ d$ which make obtuse angles with the normal portions $a\ c$ and $d\ b$ and are capable of bending through a greater angle than the portions in immediate proximity to the curved portions. The distance between the alternate concave and convex portions measured between parallel tangents to the curves is always greater than the sum of the radii of curvature of the concave and convex portions.

The function of the portion $c\ d$ whereby it relieves the curved portions 3, 4 of a part of the bending strains, and thereby reduces the wear at these points, will be better understood by reference to Fig. 2, in which the full line section shows a single corrugation of a tubular wall in normal position, neither collapsed nor extended. The upper dotted line position shows the wall expanded and the lower dotted line position shows the wall collapsed. The bend or curve 3 is on the inner curved portion of the tubular wall, and for the sake of clearness is assumed to be stationary, while the outer curved portion 4 moves in the direction of the axis of the tubular wall. Let it be assumed that an expanding force has been applied to the tubular corrugated wall of a value within the working limits for which the wall is intended. The portion $c\,d$ shown in edge view in the drawings is really a very flat frustum of a cone in the tubular corrugated wall, the base of which is connected to the normal portion $b\,d$ of the outer bend and the top is connected with the normal portion $a\,c$ of the inner bend. The expanding force applied to the tubular wall is transmitted to the lateral portion connecting the bends largely as a tensile force to increase the angles between the portion $c\,d$ with the planes of the portions $a\,c$ and $d\,b$. When the wall expands the lateral portion connecting the bends lengthens, and when the wall collapses the lateral portion is placed under a compression force, and a reverse action takes place in the portions $a\,c$, $c\,d$, and $d\,b$ to shorten the same. A certain amount of the expanding movement is thereby caused to take place in the lateral portions themselves which connect the curved portions, thus relieving the curved portions of a part of their burden. It is possible for the tubular wall as thus constructed to expand and to collapse to a certain extent without any change whatever occurring in the curved portions, as has been determined by careful measurements. In this case it is evident that the bending strain is confined to the portion $c\,d$ and the lateral portions $a\,c$ and $d\,b$ connected with it. In actual practice, however, the bending strain is not confined entirely to portion $c\,d$, for when the wall is in actual use it is generally required to expand and collapse through a considerable range, and then the bending strain extends to the curved portions. The relative share of the bending strains sustained by the different portions of my improved wall will depend upon the range through which the wall is expanded and collapsed. When the range of expanding and collapsing is small, the strain is confined almost entirely to the portion $c\,d$, but when the range is great the curved portions 3, 4 sustain the larger part of the strain. Under ordinary circumstances, the strain is fairly well distributed between the curved portions 3, 4 and the intermediate portion $c\,d$.

The advantage which I claim for my improved wall is that the portion $c\,d$ materially relieves the curved portions 3, 4 of the bending strain, thereby reducing the wear thereat, for it will be obvious that a very slight relief in a single corrugation in this respect is to be multiplied by the number of corrugations in the wall. A transfer of .015 inch in bending movement from one curved portion to the lateral portion relieves a wall of sixteen corrugations of one-half inch in movement, which amounts to a decided gain in the life of the curved portions.

To illustrate one method of making my improved wall, and the one which I prefer to employ, reference is had to Figs. 4 to 9. A thin metal tube is provided with alternate broad outward and narrow inward corrugations, Fig. 9, preferably formed in the manner described in my co-pending application, Sr. No. 366,207, filed April 3, 1907. The broad inward corrugations 5 are then deepened and narrowed by subjection to rolling pressure between a die roll 6 and a matrix roll 7, the flanges of which latter are too shallow to reach to the full depth of the corrugations. The action of these shaping rolls on the metal whereby they give to the lateral portion the desired form, will be more readily understood by a consideration of Figs. 5, 6, 7 and 8, which show a single corrugation on an enlarged scale as it is being formed, Fig. 5 showing diagrammatically portions of a pair of shaping rolls 8 and 9, the roll 8 constituting a die and the lower roll 9 a matrix. The flanges 10 of the matrix roll 9 are shorter than the depth of the corrugations in the tube to be operated on, to thereby prevent stretching of the connecting lateral portion when the die roll enters the depression in the matrix roll. The corrugations to be reshaped are the broad corrugations 11 one of which is shown, Fig. 5, in position between the rolls 8 and 9 just prior to the application of pressure. At the first application of rolling pressure to force the bend into the matrix roll 9, the radius of curvature of the bend shortens and the lateral portions connecting the alternate bends 3, 4 begin to collapse against the sides of the die roll 8, and they take the position shown in Fig. 6. Continued action of the shaping rolls begins to straighten the side and terminal portions of the bend 3 and forces the lateral portions further into contact with the sides of the die roll 8, as indicated in Fig. 7. Further rolling completes the flattening of the sides of the bend into the straight portions $a\,c$, Fig. 8. The portion marked $c\,d$ corresponding to portion $c\,d$ of Figs. 1 and 2 is under a strain when the rolling operation is completed and endeavors to relieve itself by springing inward, but is prevented from doing so by the die roll 8; as soon, however, as die roll 8 is withdrawn from the corrugation the portion $c\,d$, by virtue of the resilience of the metal, springs inward, carrying with it flat portions $d\,b$ and the exterior bends 4, 4. Each lateral portion connecting the bends 3, 4 is in the finished wall, Fig. 9, composed now of short portions $a\,c$ and $d\,b$ which merge into the bends, and a third portion $c\,d$ making an angle with the planes of the former, and it is to the presence of this portion $c\,d$ on the lateral portion connecting the bends that I attribute the improved results realized in this invention.

To explain just why the lateral wall assumes this particular shape when treated in the manner above described, I advance the following theory which apparently explains the facts, although other explanations may hereafter be advanced which are equally satisfactory. The portion c d corresponds to that particular part of the lateral wall which has been toughened and strengthened least, as fully pointed out in the description of my application Sr. No. 366,207, filed April 3, 1907, so that when the inner curved portion of the corrugation is forced into the matrix roll and thus bent into a deeper and narrower shape, the tough parts of the wall tend to retain their original shape while the relatively weak portion c d is called upon to yield to the bending operation, and is thus thrown into a plane lying at an angle to the portions a c, d b. Whether I am correct in this explanation of the causes involved in producing the result or not, the fact remains that my process, as herein set forth, never fails to produce the desired result.

I have already pointed out the desirability of having the flanges of the matrix roll shorter than the depth of the corrugation. This is desirable because if these flanges were made to bear against the outer curved portions 4, 4, while the die roll bears against the inner curved portion, this will set up a tensile strain on the lateral wall which would draw the strains out of portion c d, so that it would not spring into the slanting position after die roll 8 is removed from the corrugation. It is, however, not essential that the flanges of roll 9 should be shorter than the depth of the corrugation, provided care is taken not to allow these flanges to bear strongly against the outer curved portions 4, 4, after the inner curved portion has been deepened and narrowed by die roll 8.

I may in the case of walls of small diameter, where the corrugations are necessarily shallow and hence the lateral walls are narrower, omit the straight portion a c and allow the angular portion c d to merge directly into the inner curved portion 3. This will tend to throw a greater bending movement upon the inner curved portions 3, 3, than upon the outer curved portions 4, 4 when the wall is expanded and collapsed as it should be, because the outer bends in a corrugated fluid-pressure vessel are under greater strain than the inner bends. I prefer, however, when the corrugations are deep enough to have present in the lateral portion both of the horizontal portions a c and d b.

While I have referred to the inner and outer portions of the corrugations as being curved, and have shown them as such, it is understood that the shape of these is no part of my present invention, and they may be formed in any other way than that shown without departing from my invention. I much prefer, however, that these parts of the corrugations should be struck on a curve, as shown, for the reason that sharp angles are thereby avoided, the presence of which would constitute lines of wear and tend to shorten the life of the wall.

I have shown the corrugations here as lying in planes perpendicular to the axis of the wall. I much prefer this method of arranging the corrugations, but they may be made in the form of an ascending spiral similar to the threads of a screw, or otherwise, without departing from my invention.

What I claim is:—

1. A flexible corrugated tubular metal wall having lateral portions connecting the bends, each of said portions containing a flat portion merging into the bend and lying in a plane substantially normal to the axis of the said wall, and a portion making an obtuse angle with said flat portion and capable of bending through a greater angle than said flat portion when the wall is collapsed and expanded to relieve the strains at the curved portions of the corrugations.

2. A flexible corrugated tubular metal wall having lateral portions connecting the bends, each of said portions consisting of flat portions merging into alternate bends and lying in planes substantially normal to the axis of the said wall, and a portion connecting said flat portions making angles with the latter and capable of bending through a greater angle than said flat portions when the wall is expanded and collapsed to relieve the strains at the curved portions of the corrugations.

3. A flexible corrugated cylindrical metal wall having lateral portions connecting the bends, each of said portions containing a flat portion merging into the bend and lying in a plane substantially normal to the axis of the said wall, and a cone portion capable of bending through a greater angle than said flat portion when the wall is collapsed and expanded to relieve the strains at the curved portions of the corrugations.

4. A flexible corrugated cylindrical metal wall having lateral portions connecting the bends, each of said portions consisting of flat portions merging into alternate bends and lying in planes substantially normal to the axis of the said wall, and a cone portion connecting said flat portions capable of bending through a greater angle than said flat portions when the wall is expanded and collapsed to relieve the strains at the curved portions of the corrugations.

5. A flexible corrugated tubular metal wall having alternate concave and convex portions connected to short lateral portions, said lateral portions being united by portions lying at an angle thereto.

In testimony whereof I have signed this specification in the presence of two subscribing witnesses.

WESTON M. FULTON.

Witnesses:
E. T. MANNING,
L. A. PAINTER.